US007859787B2

(12) United States Patent
Kisaka

(10) Patent No.: US 7,859,787 B2
(45) Date of Patent: Dec. 28, 2010

(54) DISK DRIVE AND CONTROLLING METHOD THEREOF

(75) Inventor: Masashi Kisaka, Kanagawa (JP)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 0 days.

(21) Appl. No.: 12/290,047

(22) Filed: Oct. 23, 2008

(65) Prior Publication Data

US 2009/0116138 A1 May 7, 2009

(30) Foreign Application Priority Data

Oct. 30, 2007 (JP) ............................ 2007-281777

(51) Int. Cl.
*G11B 21/02* (2006.01)
*G11B 5/596* (2006.01)

(52) U.S. Cl. ..................................... 360/75; 360/77.04

(58) Field of Classification Search ....................... None
See application file for complete search history.

(56) References Cited

U.S. PATENT DOCUMENTS 3,881,184 A * 4/1975 Koepcke et al. .......... 369/30.01
5,835,300 A * 11/1998 Murphy et al. ........... 360/77.05
5,923,491 A * 7/1999 Kisaka et al. ............ 360/77.04
6,674,589 B2 * 1/2004 Min et al. ..................... 360/31
7,315,430 B2 * 1/2008 Kisaka .................... 360/77.04

FOREIGN PATENT DOCUMENTS

JP 11-297013 10/1999

* cited by examiner

*Primary Examiner*—K. Wong

(57) ABSTRACT

Embodiments of the present invention provide a disk drive capable of appropriately measuring non-linearity in a head position control system, and a control method therefore. According to one embodiment, a magnetic disk drive inputs a reference signal $S_R$ into a voice coil motor, inputs into the voice coil motor a control signal $S_C$ in which a harmonic component resulting from the reference signal $S_R$ is suppressed, and measures an error signal PES that may be obtained in the state where the reference signal $S_R$ and the control signal $S_C$, in which the harmonic component is suppressed, are input in the voice coil motor.

10 Claims, 6 Drawing Sheets

DISK DRIVE AND CONTROLLING METHOD THEREOF

CROSS-REFERENCE TO RELATED APPLICATION

The instant nonprovisional patent application claims priority to Japanese Patent Application No. 2007-281777 filed Oct. 30, 2007 and which is incorporated by reference in its entirety herein for all purposes.

BACKGROUND OF THE INVENTION

In a magnetic disk drive for a disk such as a hard disk, servo data is recorded along tracks formed on a disk medium, and the servo data is read by a head flying on the disk medium. Hence, the magnetic disk drive includes therein a feedback control system as a head position control system that controls the position of the head to follow tracks in correspondence to the servo data.

In many cases, non-linearity elements are included in a head position control system, such as described above, so identification of the non-linearity of the system is required. For example, suppose that an attempt is made to inhibit a write operation in correspondence to the position of the head. In this case, when an error signal (PES: position error signal) from which the head position is obtained is being under the influence of non-linearity, a correct position cannot be acquired from the head, and hence it is difficult to correctly inhibit the write operation. As such, the non-linearity in the position control system has to be identified to create a function value that compensates for the non-linearity.

In a normal case, in a system without feedback, a reference signal is input into the system, and a signal output from the system is compared with the reference signal, thereby to make it possible to identify the non-linearity in the system.

Nevertheless, however, in the head position control system, when the reference signal is input, a signal influenced by the non-linearity is fed back, so that non-linearity cannot be appropriately identified in accordance with the output signal.

BRIEF SUMMARY OF THE INVENTION

Embodiments of the present invention provide a disk drive capable of appropriately measuring non-linearity in a head position control system, and a control method therefore. According to the particular embodiment of FIG. 1, a magnetic disk drive 1 inputs a reference signal $S_R$ into a voice coil motor 7, inputs into the voice coil motor 7 a control signal $S_C$ in which a harmonic component resulting from the reference signal $S_R$ is suppressed, and measures an error signal PES that may be obtained in the state where the reference signal $S_R$ and the control signal $S_C$, in which the harmonic component is suppressed, are input in the voice coil motor 7.

DETAILED DESCRIPTION OF THE INVENTION

Figure 1:
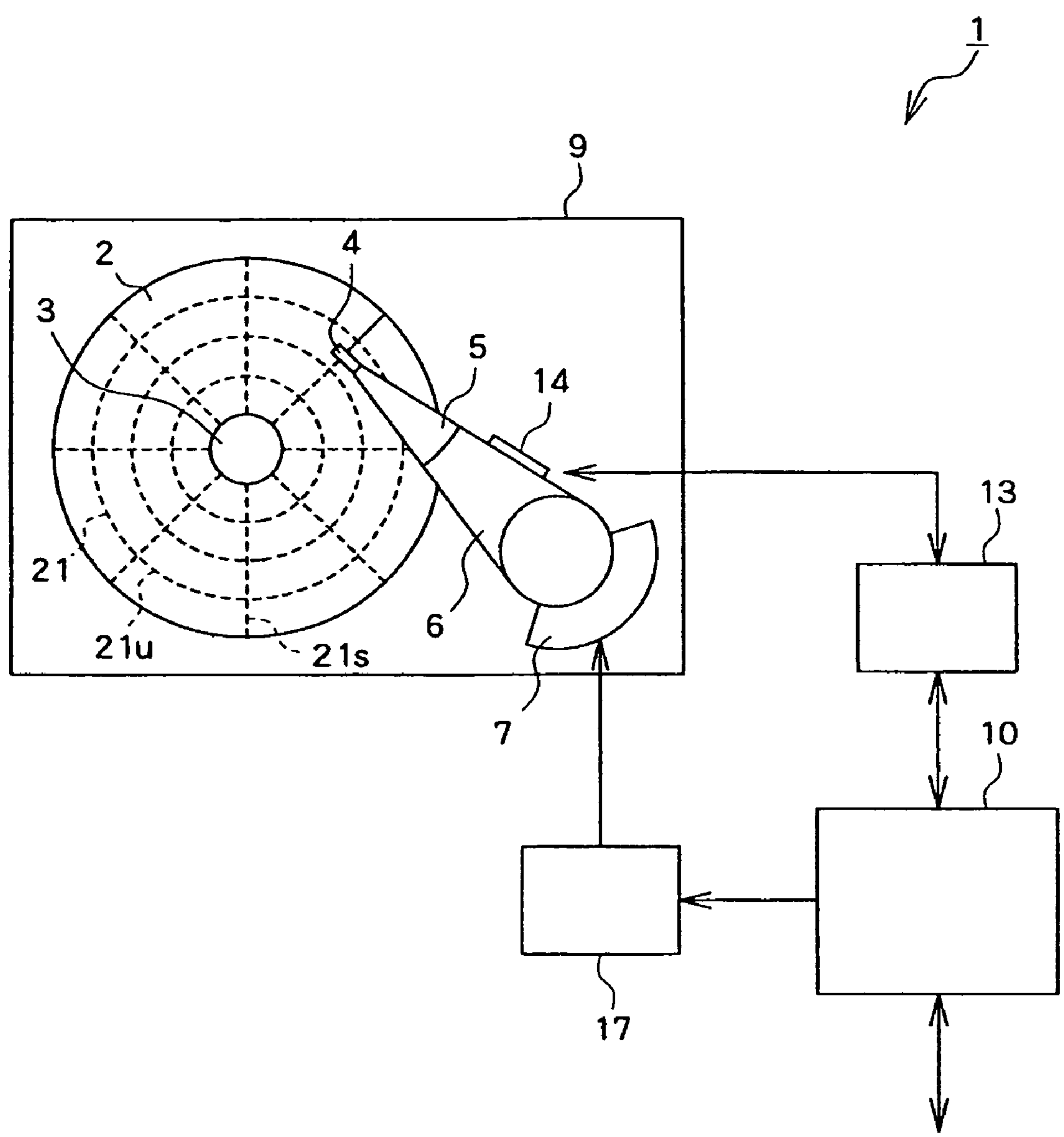
FIG. 1 is a block diagram showing an example of the configuration a magnetic disk drive according to one embodiment of a disk drive of the present invention.

Embodiments of the present invention relate to a disk drive and a control method therefore.

Embodiments of the present invention are made in view of the situations described above, and provide a disk drive capable of appropriately identifying non-linearity in a head position control system, and a method of controlling the same.

In order to solve the problems described above, a control method for a disk drive according to embodiments of the present invention is identified to operate for a disk drive set as a target including a disk medium whereon data is recorded along tracks; a head that reads out the data; an actuator that causes the head to move relative to the disk medium; and a position control circuit that receives an error signal indicative of a position error of the head with respect to the tracks and that generates a control signal for the actuator, the control signal being for suppressing the position error of the head, wherein the control method performs for inputting of a reference signal having a predetermined frequency into the actuator; inputting into the actuator a control signal wherein a harmonic component having the predetermined frequency is suppressed; and measuring an error signal obtained in a state where the reference signal and the control signal wherein the harmonic component is suppressed are input into the actuator.

In one mode of embodiments of the present invention, a phase of the reference signal and a phase of the control signal wherein the harmonic component is suppressed, are synchronized with one another.

In one mode of embodiments of the present invention, the harmonic component having the predetermined frequency contained in the measured error signal is identified.

Further, in one mode of embodiments of the present invention, a function for compensating for a non-linearity in a control system is created in accordance with the harmonic component having the identified predetermined frequency.

Further, in one mode of embodiments of the present invention the reference signal causes the head to pivotally move at least by a width of the track.

A disk drive of embodiments of the present invention comprises a disk medium whereon data is recorded along tracks; a head that reads out the data; an actuator that causes the head to move relative to the disk medium; a position control section that receives an error signal indicative of a position error of the head with respect to the tracks and that generates a control signal for the actuator, the control signal being for suppressing the position error of the head; a reference signal output section that causes inputting of a reference signal having a predetermined frequency into the actuator; a harmonic component suppression section that causes inputting into the actuator a control signal wherein a harmonic component having the predetermined frequency is suppressed; and an error signal measurement section that measures an error signal obtained in a state where the reference signal and the control signal wherein the harmonic component is suppressed, are input into the actuator.

In one mode of embodiments of the present invention, the disk drive further comprises a phase adjustment section that causes a phase of the reference signal and a phase of the control signal wherein the harmonic component is suppressed, to be synchronized with one another.

According to embodiments of the present invention, since an error signal obtained in a state where the reference signal and the control signal wherein the harmonic component is suppressed are input into the actuator is measured, the non-linearity in the head position control system may be appropriately identified.

Embodiments of the present invention will be described below with reference to the drawings.

FIG. 1 shows an example of the configuration of a magnetic disk drive 1 of one embodiment of the present invention. The magnetic disk drive 1 includes a magnetic disk 2, a spindle motor 3, a magnetic head 4, a suspension arm 5, a carriage 6, a voice coil motor 7, and a head amplifier 14 in a housing 9.

The magnetic disk drive 1 further includes a main control circuit 10, a read/write channel 13 (R/W channel), and a motor driver 17 on a baseboard external of the housing 9.

The magnetic disk 2 is rotationally driven by the spindle motor 3. Multiple tracks 21 are formed in a concentric circular arrangement on the magnetic disk 2. Further, on the respective tracks 21, there are formed servo data fields 21*s* in arrangement at a predetermined interval along the circumferential direction, and user data areas 21*u* positioned therebetween.

Servo data is recorded in the servo data field 21*s*. The servo data includes address data and a burst signal. Further, user data is recorded in the user data area 21*u*.

The magnetic head 4 is mounted in a leading edge portion of the suspension arm 5 and is supported on the magnetic disk 2. The suspension arm 5 is mounted with a base end side thereof fitted to the carriage 6 pivotally supported to the housing 9. The voice coil motor 7 pivotally drives the carriage 6, thereby moving the magnetic head 4 substantially in the radial direction on the magnetic disk 2.

The main control circuit 10 includes a microprocessing unit (MPU) and a memory such as a ROM or RAM. The main control circuit 10 reads out and executes programs stored in the memory, thereby implementing various types of control, such as position control of the magnetic head 4 and recording/playback control of data. In the present embodiment, the main control circuit 10 functions as a position control circuit.

The main control circuit 10 includes a hard disk controller (HDC) and a buffer memory. The HDC includes, for example, an interface controller, an error correction circuit, and a buffer controller.

In position control of the magnetic head 4, the main control circuit 10 identifies the current position of the magnetic head 4 in accordance with servo data input from the R/W channel 13, generates a control signal that causes the magnetic head 4 to be positioned on a target track, and then outputs the signal to the motor driver 17. The motor driver 17 performs analog conversion and amplification of the control signal and outputs the signal to the motor driver 17.

In recording/playback control of data, upon receipt from an external host, user data to be recorded onto the magnetic disk 2, the main control circuit 10 outputs the user data to the R/W channel 13. Further, when the demodulated user data is input from the R/W channel 13, the main control circuit 10 transmits the user data to the external host. Further, the main control circuit 10 causes the user data to be temporarily stored into the buffer memory.

When the user data is input from the main control circuit 10, the R/W channel 13 modulates and outputs the user data to the head amplifier 14. Further, when the amplified playback signal is input from the head amplifier 14, the R/W channel 13 converts the playback signal into digital data, and demodulates and outputs the data to the main control circuit 10. Further, the R/W channel 13 extracts servo data from the playback signal at a predetermined sampling interval and outputs the data to the main control circuit 10.

When the modulated user data is input from the R/W channel 13, the head amplifier 14 converts the user data into a recording signal and outputs it to the magnetic head 4. Further, when a playback signal read out from the magnetic disk 2 is input from the magnetic bead 4, the bead amplifier 14 amplifies and outputs the playback signal to the R/W channel 13.

When the recording signal is input from the head amplifier 14, the magnetic head 4 applies a recording magnetic field corresponding to the recording signal to the magnetic disk 2. Thereby, a magnetization representative of user data is recorded onto the magnetic disk 2. Further, the magnetic head 4 reads out, as a playback signal, a magnetic field leaked from the magnetization recorded on the magnetic disk 2, and outputs the playback signal to the head amplifier 14.

Figure 2:
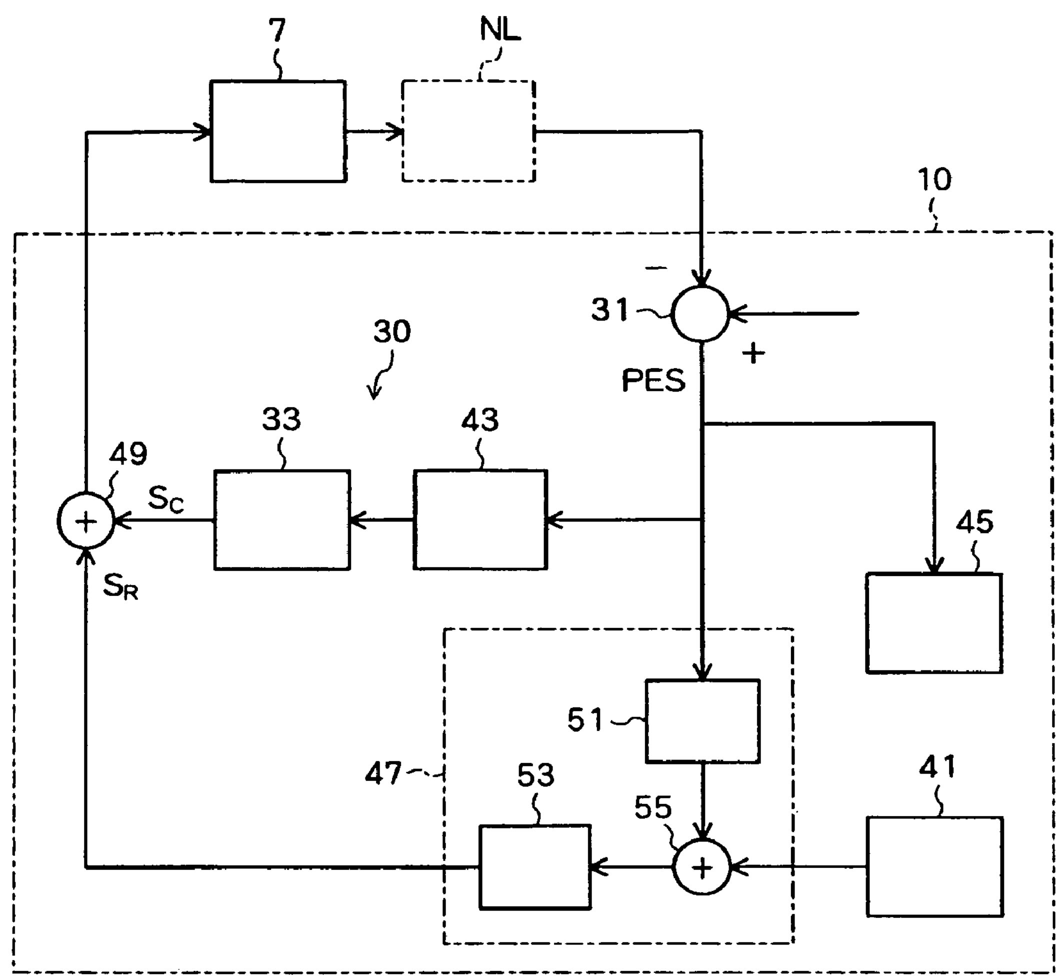
FIG. 2 is a block diagram showing an example of the configuration of a main control circuit.

FIG. 2 shows an example of a functional configuration in an error signal measurement mode of the main control circuit 10. The error signal measurement mode is used in the event of, for example, the manufacture of the magnetic disk drive 1.

The main control circuit 10 includes a feedback control system as a position control system 30 that includes an error signal generation circuit 31 that generates an error signal PES (position error signal) representative of a position error of the magnetic head 4 from servo data read out by the magnetic head 4, and the controller 33 that generates a control signal $S_C$ for suppressing the position error of the magnetic head 4 in accordance with the error signal PES and that outputs the control signal $S_C$ to the voice coil motor 7.

A non-linear element NL is included in the position control system 30, so that, in the error signal measurement mode, the main control circuit 10 measures the error signal PES to identify the non-linearity in the position control system 30.

Hence, as a configuration for identifying the non-linearity in the position control system 30, the main control circuit 10 includes a reference signal output section 41, a harmonic component suppression section 43, an error signal measurement section 45, a phase adjustment section 47, and an adding section 49, in addition to the error signal generation circuit 31 and the position control system 30.

The error signal generation circuit 31 identifies a current position of the magnetic head 4 in accordance with the servo data input from the R/W channel 13 and then obtains a differential between a target position and the current position, thereby to generate an error signal PES. The error signal PES is generated from a burst signal contained in the servo data.

The controller 33 generates a control signal $S_C$, which is used to drive the voice coil motor 7, in accordance with the error signal PES generated by the error signal generation circuit 31 (more specifically, the error signal PES suppressed by the harmonic component suppression section 43 for its harmonic component, as described further below). The control signal $S_C$ suppresses the position error of the magnetic head 4, thereby to stabilize the position control system 30.

The reference signal output section 41 causes a reference signal $S_R$ at a single frequency to be input into the position control system 30, while the output of the reference signal output section 41 is a cosine wave having a frequency $\omega_0$. The reference signal $S_R$ becomes a trigonometric function wave having the single frequency, thereby driving the voice coil motor 7 to cause the magnetic head 4 to pivotally move.

More specifically, the reference signal $S_R$ is added by the adding section 49 to the control signal $S_C$ output from the controller 33, and the resultant signal is input into the voice coil motor 7 through the motor driver 17.

Figure 4:
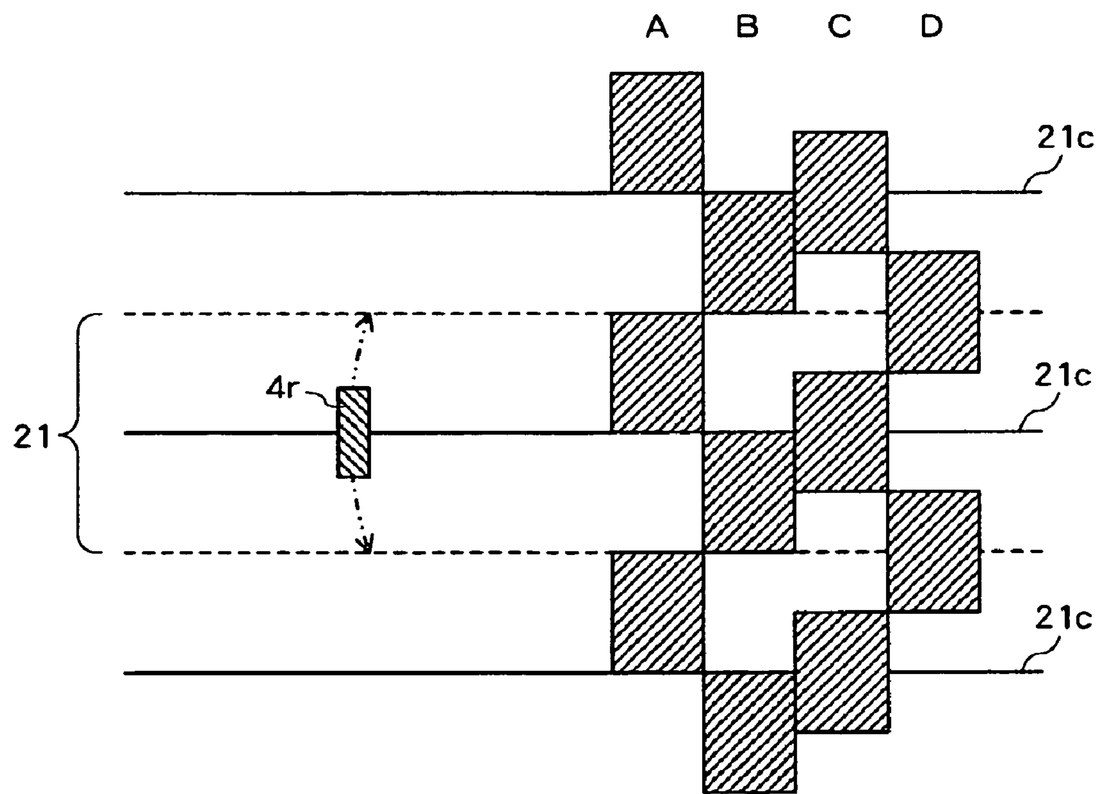
FIG. 4 is an explanatory view showing the relationship between a magnetic head and tracks.

Further, as shown in FIG. 4, the reference signal $S_R$ has an amplitude sufficient to cause the magnetic head 4 to pivotally move at least by a width of the track 21. A playback or read element 4*r* of the magnetic head 4 is positioned basically at a track center 21*c* by the operation of the controller 33. Then, when the reference signal $S_R$ is input, the read element 4*r* is pivotally moved at least over the width of the track 21 with respect to the center on the track center 21*c*. Thereby, since the burst signal is read by the read element 4*r* over the width of the track 21, it is well suited to obtain the relationship between the error signal PES and the position of the magnetic head 4.

Returning to description with reference to FIG. 2, the harmonic component suppression section 43 is provided inside of the position control system 30 (more specifically, on a feedback path) to suppress harmonic components (components of a second or higher harmonics) of the frequency $\omega_0$.

More specifically, when the reference signal $S_R$ at the frequency $\omega_0$ is input into the voice coil motor 7, harmonic components of the frequency $\omega_0$ appear with a signal in the position control system 30 because of the non-linear element NL, which is contained in the position control system 30, whereby the waveform of the signal is distorted. When a signal containing such a harmonic component is fed back and input into the voice coil motor 7, it cannot be identify whether a deflection of the magnetic head 4 is caused by the operation of the controller 33 or the influence of the harmonic component, therefore making it difficult to identify the non-linearity. Hence, the harmonic component of the frequency $\omega_0$ is suppressed by the harmonic component suppression section 43.

More specifically, the harmonic component suppression section 43 suppresses the harmonic component of the frequency $\omega_0$ contained in the error signal PES input from the error signal generation circuit 31, and output the signal to the controller 33. Thereby, the harmonic component of the frequency $\omega_0$ may be suppressed from being contained in the control signal $S_C$ output from the controller 33. More specifically, the harmonic component of the frequency $\omega_0$ is eliminated, and the control signal $S_C$ contains mainly a linear or first-order component (wave at the frequency $\omega_0$), so that the input signal, which is composed of the added reference signal $S_R$ and control signal $S_C$, into the voice coil motor 7 may be controlled to be the wave at the frequency $\omega_0$.

Figure 3:
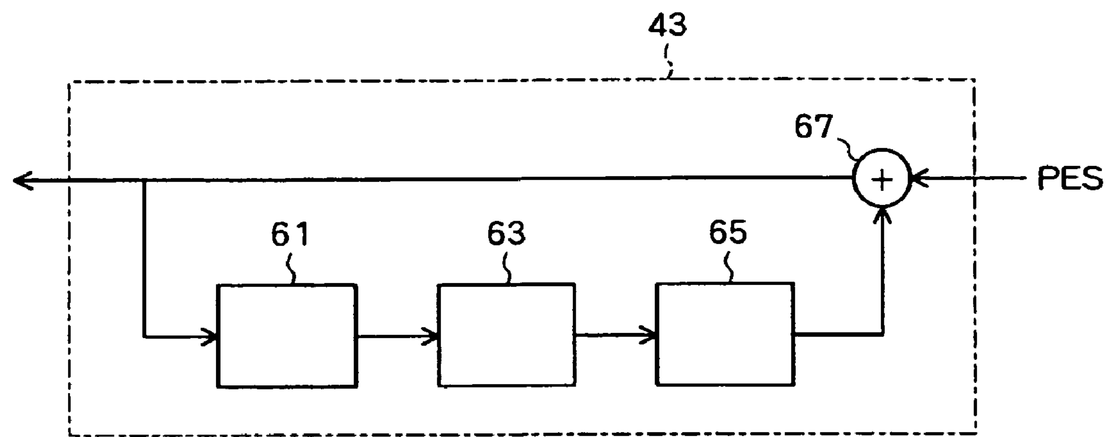
FIG. 3 is a block diagram showing an example of the configuration of a harmonic control section.

As shown in FIG. 3, the harmonic component suppression section 43 includes a constant section 61, a low band boost filter 63, an iterative error elimination filter 65, and an adding section 67. The output of the harmonic component suppression section 43 is a signal acquired in the manner that a feedback signal passed through the constant section 61, the low band boost filter 63, and the iterative error elimination filter 65 and the error signal PES are added together by the adding section 67.

The constant section 61 multiplies the error signal PES by a constant that stabilizes the position control system 30. The constant is determined to be a positive constant smaller than 1, in which multiple peaks (primarily, peaks associated with high frequency components of the frequency $\omega_0$) are narrowed, thereby to reduce the absolute value of the error signal PES. Thereby, the stabilization of the position control system 30 is accomplished.

The low band boost filter 63 is set up to suppress the signal intensity of the first-order component at the frequency $\omega_0$ of components of the error signal PES. Thereby, of components of the error signal PES, the first-order component at the frequency $\omega_0$ is not passed through, but harmonic components of the frequency $\omega_0$ are passed through. A transfer function L of the low band boost filter 63 may be expressed as Equation 1 below.

$$L = \frac{z^2 - 2\cos\omega_0 t_s z + I}{(z - 0.995)^4} \quad \text{[Equation 1]}$$

When the error signal PES with a remaining harmonic component of the frequency $\omega_0$ is input, the iterative error elimination filter 65 outputs a signal at the opposite phase relative to the harmonic component (that is, a signal having a peak at the opposite phase relative to the peak of the respective order). A transfer function Z of the iterative error elimination filter 65 may be expressed as Equation 2 below. In this case, ft(z) represents a phase stabilization filter.

$$Z = \frac{z - 1}{z^M - 1} f, (z) \quad \text{[Equation 2]}$$

Then, the signal at the opposite phase relative to the harmonic component output from the iterative error elimination filter 65 is added by an adding section 55 to the error signal PES. Thereby, the error signal PES in which the harmonic component of the frequency $\omega_0$ is suppressed is output. More specifically, in the error signal PES output from the harmonic component suppression section 43, the harmonic component of the frequency $\omega_0$ is suppressed, and the zero-order component (DC (direct current) term) and the first order component (wave at the frequency $\omega_0$) remain.

Even the first-order component at the frequency $\omega_0$ may be eliminated without providing the low band boost filter 63.

Returning to description with reference to FIG. 2, the phase adjustment section 47 causes the phase of the reference signal $S_R$ and the phase of the control signal $S_C$ to be synchronized with one another. The phase adjustment section 47 includes a band pass filter 51, a peak filter 53, and an adding section 55.

The band pass filter 51 passes bands including the frequency $\omega_0$ in the error signal PES. Further, the adding section 55 adds together a signal at the frequency $\omega_0$ that is passed through the band pass filter 51, and the cosine signal at the frequency $\omega_0$ that has been generated by the reference signal output section 41, and then outputs the result to the peak filter 53.

The peak filter 53 generates and outputs a signal in which the component at the frequency $\omega_0$ has been amplified. A transfer function P of the peak filter 53 may be expressed as Equation 3 below. In this case, D(z) represents a phase stabilization filter.

$$P = \frac{D(z)}{z^2 - 2\cos\omega_0 t_s z + 1} \quad \text{[Equation 3]}$$

In this case, the peak filter 53 adjusts the phase of a signal that is output so that an input signal becomes 0. More specifically, the peak filter 53 adjusts the phase and amplitude of the reference signal $S_R$ so that the signal (error signal) at the frequency $\omega_0$ that passes through the band pass filter 51 (the first-order component at the frequency $\omega_0$ that is contained in the error signal PES) cancels the cosine signal at the frequency $\omega_0$ that is generated by the reference signal output section 41.

Thereby, the phase and amplitude of the PES input into the position control system 30 may be synchronized with the phase and amplitude of the cosine signal generated by the reference signal output section 41, and further, the signal to be input into the voice coil motor 7 may be controlled to be the wave at the frequency $\omega_0$.

Next, the error signal measurement section 45 measures the error signal PES that may thus be acquired in the state that the signal having the wave at the frequency $\omega_0$ is input into the voice coil motor 7. In this case, since the signal having the wave at the frequency $\omega_0$ is input into the voice coil motor 7, the harmonic component at the frequency $\omega_0$ is contained in the error signal PES acquired.

Then, the main control circuit 10 identifies the harmonic component at the frequency $\omega_0$ that is contained in the measured error signal PES, and creates a function necessary to compensate for the non-linearity in the position control system 30 in accordance with the identified harmonic component at the frequency $\omega_0$. This calculation may be performed through an external computer by use of the measured error signal PES.

Figure 5:
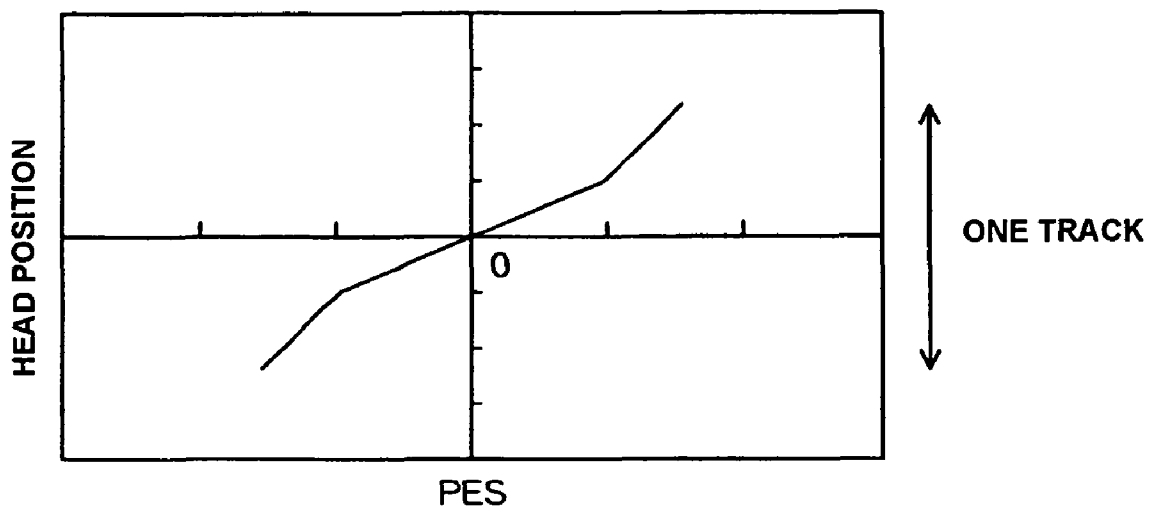
FIG. 5 is a graph showing an actual relationship between an error signal PES and a head position.

By way of a reference, FIG. 5 shows an actual relationship between the error signal PES and the head position when the magnetic head 4 is positioned on an arbitrary track. In the drawing figure, 0 on the head position indicates the track center 21*c* (refer to FIG. 4). As shown in FIG. 5, it may be known that the error signal PES and the head position have a non-linear relationship. This is because, the position control system 30 has the non-linearity.

As such, the non-linearity in the position control system 30 has to be compensated for in order to acquire the head position from the error signal PES. Calculations form creating a function that compensates for the non-linearity in the position control system 30 is described below.

First, a first-order component A at the frequency $\omega_0$ contained in the error signal PES (represented by x, hereinbelow) acquired by the error signal measurement section 45 is obtained through a Fourier transformation. The first-order component A at the frequency $\omega_0$ is expressed as Equation 4 below. In Equation 4, n is a number of sampling times. Further, N is preferably set to a value corresponding to at least one cycle of the track. In regard to the phase of the linear component, since the phase of the error signal PES is adjusted by the phase adjustment section 47 to be the opposite phase with respect to the cosine signal generated by the reference signal output section 41, only a cosine component may be calculated.

$$A = \frac{2}{N}\sum_{n=0}^{N-t} x(n)\cos\omega_0 n \qquad \text{[Equation 4]}$$

Figure 6:
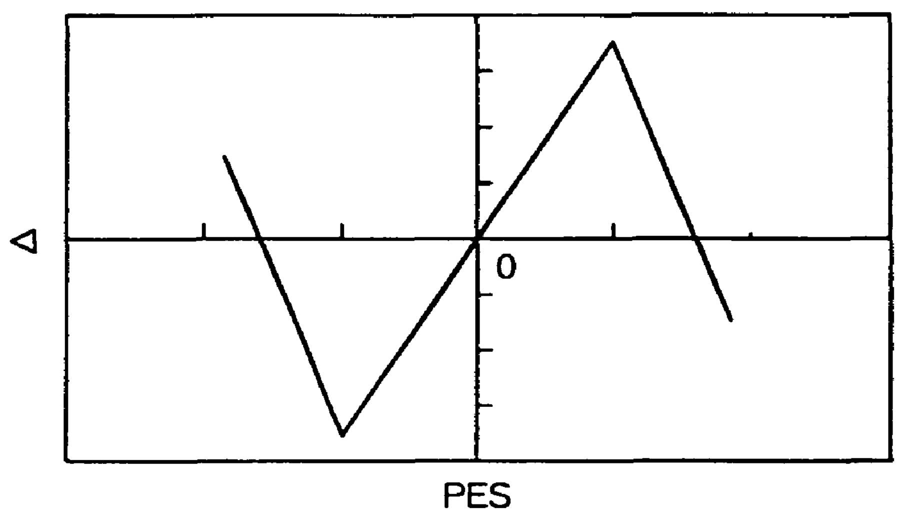
FIG. 6 is a graph showing the relationship between the error signal PES and a non-linear component A contained in the error signal PES.

Thereby, a harmonic component Δ of the frequency $\omega_0$ contained in the error signal PES may be expressed as the differential "x−A" between the error signal PES and the first-order component A. The relationship between the error signal PES and the harmonic component Δ is represented as a graph of FIG. 6, for example.

Subsequently, the harmonic component Δ is approximated through cubic or third-order function f(x). The third-order function f(x) is expressed as Equation 5 below. In Equation 5, a0, a1, a2, and a3 are coefficients of x.

$$f(x)=a_0+a_1x+a_2x^2+a_3x^3 \qquad \text{[Equation 5]}$$

In this case, the differential "Δ−f(x)" between the harmonic component Δ and the third-order function f(x) is used as evaluation function E, the evaluation function E is expressed as Equation 6 below.

$$E = \sum_{n=0}^{K} (x(n) - A\cos\omega_0 n - a_0 - a_1 x - a_2 x^2 - a_3 x^3)^2 \qquad \text{[Equation 6]}$$

Figure 7:
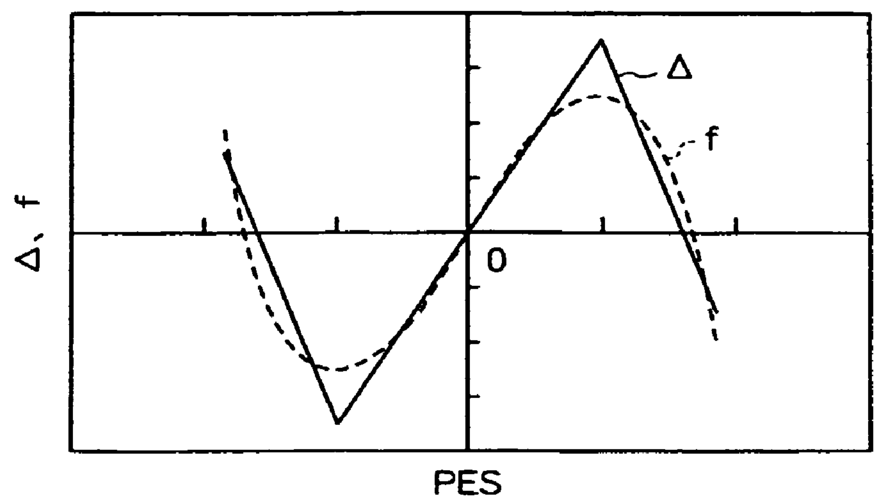
FIG. 7 is a graph showing the relationship between the error signal PES and function f used for approximation of the non-linear component Δ.

By obtaining the coefficients a0, a1, a2, and a3 minimizing the evaluation function E, the third-order function f(x) used for the approximation of the harmonic component Δ is created. The third-order function f(x) obtainable in this manner is represented as a graph of FIG. 7, for example. The approximation of the harmonic component Δ may be performed not only as the above described, but by using a different approximation method.

In this manner, the differential "x−f(x)" between the error signal PES and the third-order function f(x) used for the approximation of the harmonic component Δ may be obtained as a function that compensates for the non-linearity in the position control system 30.

Further, in order to obtain the head position from the error signal PES by use of the function "x−f(x)," the value of coefficient K is adjusted so that "K(x−f(x))," which is a K-multiplied function, conforms to a predetermined reference.

For example, with reference to FIG. 4, in a position where the magnetic head 4 shifts by ¼ of the track width from the track center 21*c*, it is known that the value of the error signal PES is "A/(A+B)=C/(C+D)=0.5." Hence, the coefficient K is obtained with the point used as a reference point. This point is known as a point at which the non-linearity is most likely to appear.

Figure 8:
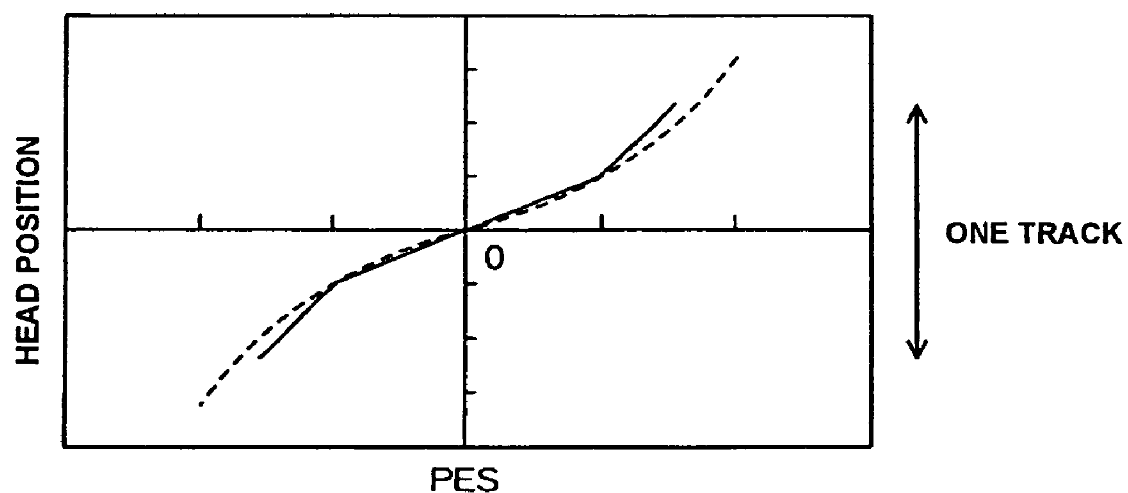
FIG. 8 is a graph showing comparison between the actual head position and the function f used for approximation of the non-linear Δ.

In FIG. 8, K(x−f(x)), which is adjusted as described above, is shown by the broken line. In addition, the solid line in the drawing figure represents the actual relationship shown in FIG. 5 between the error signal PES and the head position.

In this manner, the non-linearity in the position control system 30 is compensated for by use of the function "x−f(x)" obtained from the measured error signal PES, thereby making it possible to properly identify the position of the magnetic head 4 from the error signal PES.

Figure 9:
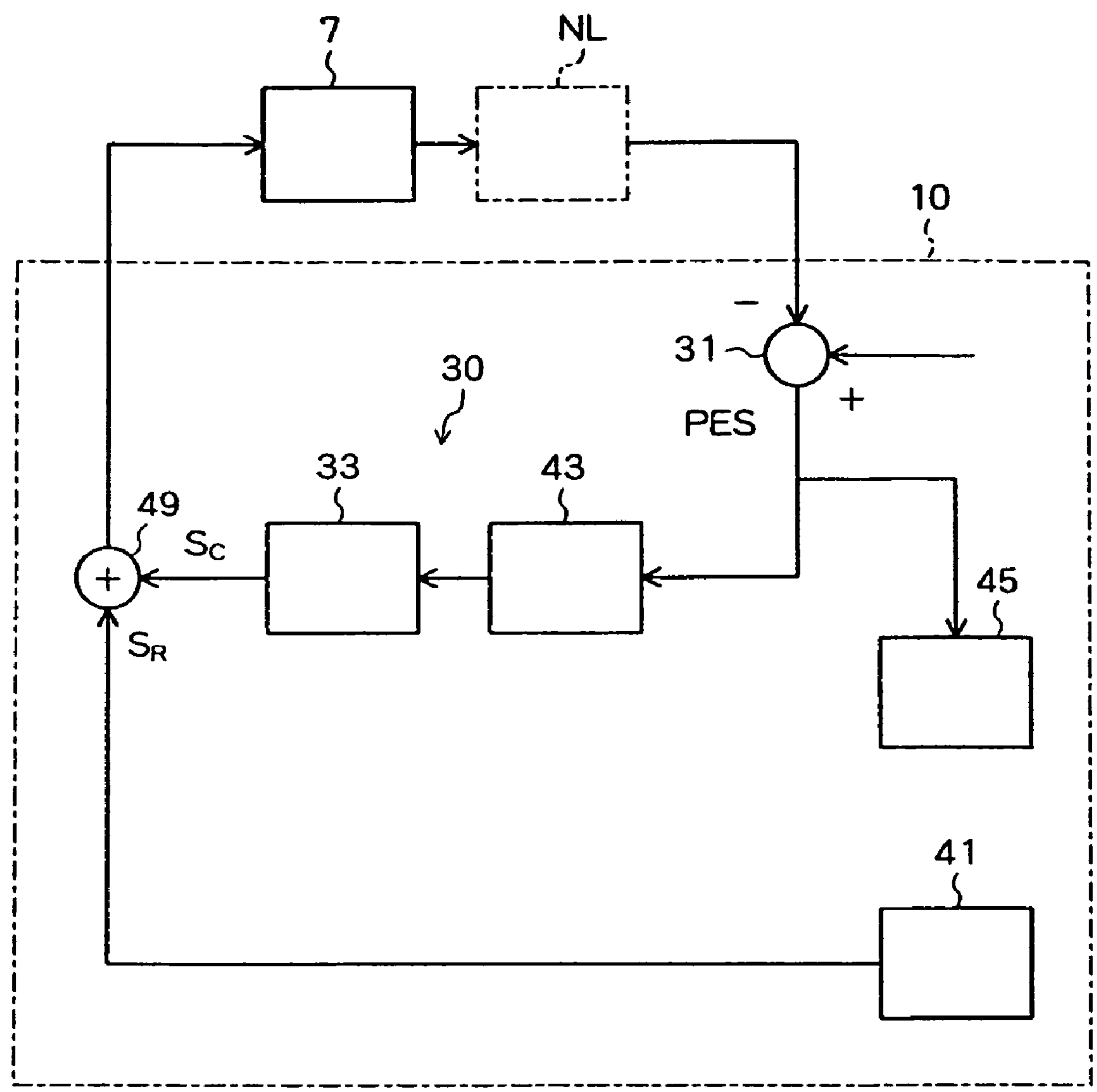
FIG. 9 is a block diagram showing a modified example of the main control circuit.

While embodiments of the present invention have been described above, the present invention is not limited to the form of these embodiments. For example, as shown in FIG. 9, the functional configuration of the main control circuit 10 may be formed to omit the phase adjustment section 47. In this case, the phase of the error signal PES does not always match the phase of the signal generated by the reference signal output section 41, so that an initial phase of the error signal PES to be measured has to be obtained.

What is claimed is:

1. A control method for a disk drive, the disk drive including:

a disk medium whereon data is recorded along tracks;

a head that reads out the data;

an actuator that causes the head to move relative to the disk medium; and a position control circuit that receives an error signal indicative of a position error of the head with respect to the tracks and that generates a control signal for the actuator, wherein the control signal suppresses the position error of the head, the control method comprising:

inputting a reference signal having a predetermined frequency into the actuator;

inputting the control signal into the actuator, wherein a harmonic component of the control signal that has the predetermined frequency is suppressed; and measuring the error signal when the reference signal and the control signal with the harmonic component are input into the actuator causing the actuator to move the head relative to the disk medium.

2. The control method according to claim 1, wherein a phase of the reference signal and a phase of the control signal with the suppressed harmonic component is are synchronized with one another.

3. The control method according to claim 1, wherein the harmonic component having the predetermined frequency is identified in the measured error signal.

4. The control method according to claim 1, wherein a function for compensating for a non-linearity in a control system is created in accordance with the harmonic component having the predetermined frequency.

5. The control method according to claim 1, wherein the reference signal causes the head to pivotally move at least by a track width.

6. A disk drive comprising:

a disk medium whereon data is recorded along tracks;

a head that reads out the data;

an actuator that causes the head to move relative to the disk medium;

a reference signal output section that inputs a reference signal having a predetermined frequency into the actuator;

a harmonic component suppression section that is configured to receive an error signal indicative of a position error of the head with respect to the tracks and generate a control signal for suppressing the position error of the head, wherein a harmonic component of the control signal that has the predetermined frequency is suppressed, the control signal with the suppressed harmonic component being input into the actuator; and an error signal measurement section that measures the error signal when the reference signal and the control signal with the suppressed harmonic component are input into the actuator causing the actuator to move the head relative to the disk medium.

7. The disk drive according to claim 6, further comprising a phase adjustment section that synchronizes a phase of the reference signal and a phase of the control signal with the suppressed harmonic component.

8. The disk drive according to claim 6, wherein the harmonic component having the predetermined frequency is identified in the measured error signal.

9. The disk drive according to claim 6, wherein a function for compensating for a non-linearity in a control system is created in accordance with the harmonic component having the predetermined frequency.

10. The disk drive according to claim 6, wherein the reference signal causes the head to pivotally move at least by a track width.

* * * * *